United States Patent
Chen et al.

(10) Patent No.: US 8,997,074 B1
(45) Date of Patent: Mar. 31, 2015

(54) DYNAMIC LINKING LIBRARY (DLL) REPLACEMENT IN AN EMBEDDED OPERATING SYSTEM ENVIRONMENT

(75) Inventors: Gen Chen, Nanjing (CN); Zhentao Huang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1648 days.

(21) Appl. No.: 11/537,551

(22) Filed: Sep. 29, 2006

(51) Int. Cl.
*G06F 9/44* (2006.01)
*G06F 21/56* (2013.01)

(52) U.S. Cl.
CPC .................................. *G06F 21/568* (2013.01)
USPC .......................................................... 717/163

(58) Field of Classification Search
None
See application file for complete search history.

(56) References Cited

U.S. PATENT DOCUMENTS

| | | | | |
|---|---|---|---|---|
| 5,247,681 A * | 9/1993 | Janis et al. | ..................... | 719/331 |
| 5,946,486 A * | 8/1999 | Pekowski | ..................... | 717/128 |
| 6,071,317 A * | 6/2000 | Nagel | ..................... | 717/128 |
| 6,665,735 B1 * | 12/2003 | Tanaka et al. | ..................... | 719/331 |
| 6,678,734 B1 * | 1/2004 | Haatainen et al. | ..................... | 709/230 |
| 6,959,441 B2 * | 10/2005 | Moore | ..................... | 719/328 |
| 7,287,253 B2 * | 10/2007 | Yamamura et al. | ..................... | 717/176 |
| 2004/0210680 A1 * | 10/2004 | Yamamura et al. | ..................... | 710/8 |

* cited by examiner

*Primary Examiner* — Don Wong
*Assistant Examiner* — Erika Kretzmer
(74) *Attorney, Agent, or Firm* — IPSG, P.C. Intellectual Property Law

(57) ABSTRACT

Techniques for replacing ROM-based (Read-Only Memory) DLLs (Dynamic Link Libraries) in a Windows CE type embedded operating system such that the target DLL is replaceable by the hook DLL, and the target DLL is callable by the hook DLL but not callable directly by any other applications after loading of the hook DLL. The techniques enable replacement irrespective whether the hook DLL and the target DLL have the same name and irrespective of which DLL is loaded first. The techniques change the file name of the target DLL in a list of loaded DLL modules by a trusted program that executes in the full kernel mode.

7 Claims, 5 Drawing Sheets

Fig. 3

```
#include <psyscall.h>
include <pkfuncs.h> define ENTER_KERNEL DWORD oldP= SetProcPermissions(-1);DWORD oldM= SetKMode( TRUE);
define LEAVE_KERNEL SetKMode( oldM); SetProcPermissions( oldP);

LPWSTR GetModuleName( LPWSTR srcName)
{
    LPWSTR pR= NULL;
    int aModNum= 0;
    int i= 0;
    ENTER_KERNEL
    Module* apModule= (Module*)UserKInfo[KINX_MODULES];
    for( ;apModule; aModNum++, apModule= apModule->pMod);
    if( aModNum== 0)
        return pR;
    for( apModule= (Module*)UserKInfo[KINX_MODULES]; apModule&& i< aModNum; i++)
    {
        if( wcsicmp( apModule->lpszModName, srcName)== 0)
        {
            pR= apModule->lpszModName;
            break;
        }
        apModule= apModule->pMod;
    }
    LEAVE_KERNEL
    return pR;
}
BOOL ChangeModuleName( LPWSTR srcName/* the original module name */
            , LPWSTR dstName /* the name after changed*/)
{
    BOOL r= FALSE;
    LPWSTR p= NULL;
    if( !(srcName && dstName))
        return r;
    if( p= GetModuleName( srcName))
    {
        ENTER_KERNEL
        wcscpy( p, dstName);
        LEAVE_KERNEL
        r= TRUE;
    }
    return r;
}
```

DYNAMIC LINKING LIBRARY (DLL) REPLACEMENT IN AN EMBEDDED OPERATING SYSTEM ENVIRONMENT

BACKGROUND OF THE INVENTION

Software applications are typically executed using an operating system of a computer system. As is well known, the WINDOWS-based operating system by Microsoft Corporation of Redmond, Wash. enjoys a large installed base. As a consequence, software makers strive to create software applications that can be executed by the WINDOWS-based operating system so that the software application may enjoy the greatest possible market share.

In most cases, the installation and execution of a software application (such as for example an anti-virus program) may require the loading of a hook DLL (Dynamic Link Library) to replace the existing DLL managed by the WINDOWS-based operating system. In a WINDOWS-based operating system known as the WINDOWS CE operating system, the installation of a given software application may require the loading of a hook DLL to replace an existing target DLL. After the hook DLL is loaded, the hook DLL handles all subsequent calls made by the newly installed application as well as all subsequent calls that are made by existing applications to the now-replaced target DLL. That is, the target DLL that has been replaced does not get called directly by any other application programs. Instead, the target DLL is called only by the replacement hook DLL.

In the WINDOWS CE operating system environment, DLL replacement requires two necessary conditions: 1) that the target DLL be replaced by a replacement DLL during execution, and 2) that the target DLL not be directly called by any application after the hook DLL is loaded except to the extent that calls are made from the hook DLL to the target DLL.

In the WINDOWS CE operating system environment, system DLLs are in ROM (Read-Only Memory). Although ROM DLLs can not be overwritten, a RAM DLL can still replace, practically speaking, the corresponding target DLL in ROM if the RAM DLL shares the same name as the ROM DLL. That is, when loading a DLL, the WINDOWS CE operating system environment only examines the DLL file name and ignores the path string in deciding whether a given DLL has already been loaded. If a DLL has been loaded (whether from RAM or ROM), other DLLs having the same name will not be loaded.

Accordingly, while it is possible to replace an existing ROM DLL with a RAM DLL (by loading the RAM DLL first), this approach creates another problem since DLL replacement also requires that the ROM-based DLL be loadable so that it can be called on by the replacement RAM DLL. This requirement is illustrated in FIG. 1 wherein a hook DLL 102, which is loaded to replace an existing target DLL 104, makes calls to target DLL 104 (the original ROM-based DLL) while all other applications are prohibited from making direct calls to target DLL 104. In other words, after the RAM-based DLL 102 is loaded to facilitate the execution of application 106, application 106 can indirectly make calls to target ROM-based DLL 104 only by making calls to replacement RAM-based DLL 102 first. Likewise, applications 108 and 112 can indirectly make calls to target ROM-based DLL 104 only by making calls to replacement RAM-based DLL 102.

If ROM-based DLL 104 cannot be loaded so that it can be called by replacement RAM-based DLL 102, the second condition for DLL replacement (i.e., that the target DLL not be directly called after the hook DLL is loaded except to the extent that calls are made from the hook DLL to the target DLL) cannot be met. As such, DLL replacement would fail in the WINDOWS CE operating system environment.

SUMMARY OF INVENTION

The invention relates, in an embodiment, to a method for replacing a DLL (Dynamic Link Library) in a Windows CE operating system environment. The method includes loading a first one of a hook DLL and a target DLL representing a DLL to be replaced, the hook DLL representing a DLL for replacing the target DLL. If the hook DLL is loaded first, the method includes changing a name of the hook DLL to a first temporary name, thereafter loading the target DLL, thereafter changing a name of the target DLL to a private name that is subsequently callable by the hook DLL but not callable by other applications executing the Windows CE operating system environment, and thereafter restoring the name of the hook DLL from the first temporary name to a name that is callable by the other applications. The method further includes changing, if the target DLL is loaded first, the name of the target DLL to the private name, and thereafter loading the hook DLL.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows, in accordance with an embodiment of the present invention, a code section for implementing DLL replacement by replacing the ROM-based target DLL with a RAM hook DLL in the WINDOWS CE operating system environment..

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided computer-implemented methods for replacing DLLs in a WINDOWS CE operating system environment such that the target DLL is replaceable by the hook DLL, and the target DLL is callable by the hook DLL but not callable directly by any other applications after the loading of the hook DLL.

Recalling that if the hook DLL is loaded first before the target DLL is loaded, and both DLLs share the same file name, the WINDOWS CE operating system inhibits the target DLL from being subsequently loaded. This is true even if the two DLLs have different path names. Accordingly, the target DLL cannot be made available to be called by the hook DLL.

Figure 5:
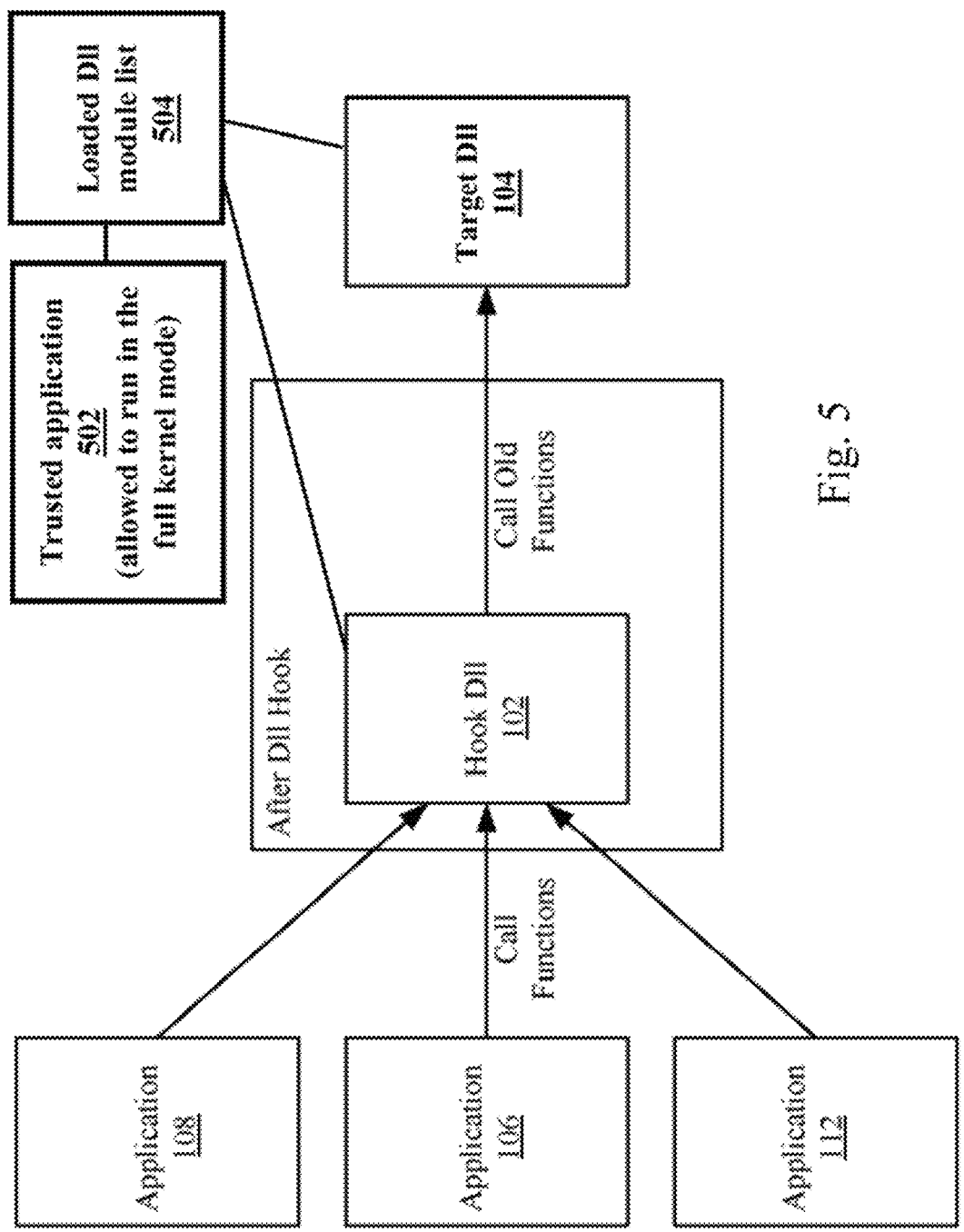
FIG. 5 shows an example environment wherein DLL replacement is practiced in accordance with one or more embodiments of the invention.

In embodiments of the invention, the aforementioned problem is solved by using a trusted application, e.g., trusted application 502 illustrated in the example of FIG. 5, to manipulate DLL file names so that both the hook DLL and the target DLL can be loaded. An application is deemed trusted if it is allowed to run in the full kernel mode in a WINDOWS operating system. In this full kernel mode, the trusted application can access the list of loaded DLL modules, e.g., loaded DLL module list 540 illustrated in the example of FIG. 5, and therefore has the ability to manipulate the file names of the DLLs to accomplish the dual loading of both the hook DLL and the target DLL.

After the hook DLL and the target DLL are loaded, the names of the DLLs are again manipulated such that the hook DLL will end up with the right name whereby the target DLL assumes a name, which may be randomly chosen, that is known only to the hook DLL. As such, the target DLL is callable only by the hook DLL and is not directly callable by any other applications. Further, since the hook DLL now has the correct name, it can be called by applications executing in the computer system.

In embodiments of the invention, successful DLL replacement is achieved irrespective whether the target DLL or the hook DLL is loaded first. In an embodiment, if the target DLL is loaded first, the target DLL name is changed by the trusted application after the target DLL is loaded, thus allowing a similarly named hook DLL to be subsequently loaded. The name of the target DLL is preferably changed to a name that is known only by the hook DLL so that only the hook DLL can directly call the target DLL.

In another embodiment, if the hook DLL is loaded first, the hook DLL name is changed to another file name to allow the target DLL to be subsequently loaded. After the target DLL is loaded, the name of the target DLL is changed to a name that is known only to the hook DLL. Thereafter, the hook DLL name is restored, allowing the hook DLL to be called by applications executing in the computer system. Further, since the name of the target DLL is changed to a name that is known only by the hook DLL, only the hook DLL can directly call the target DLL.

Figure 1:
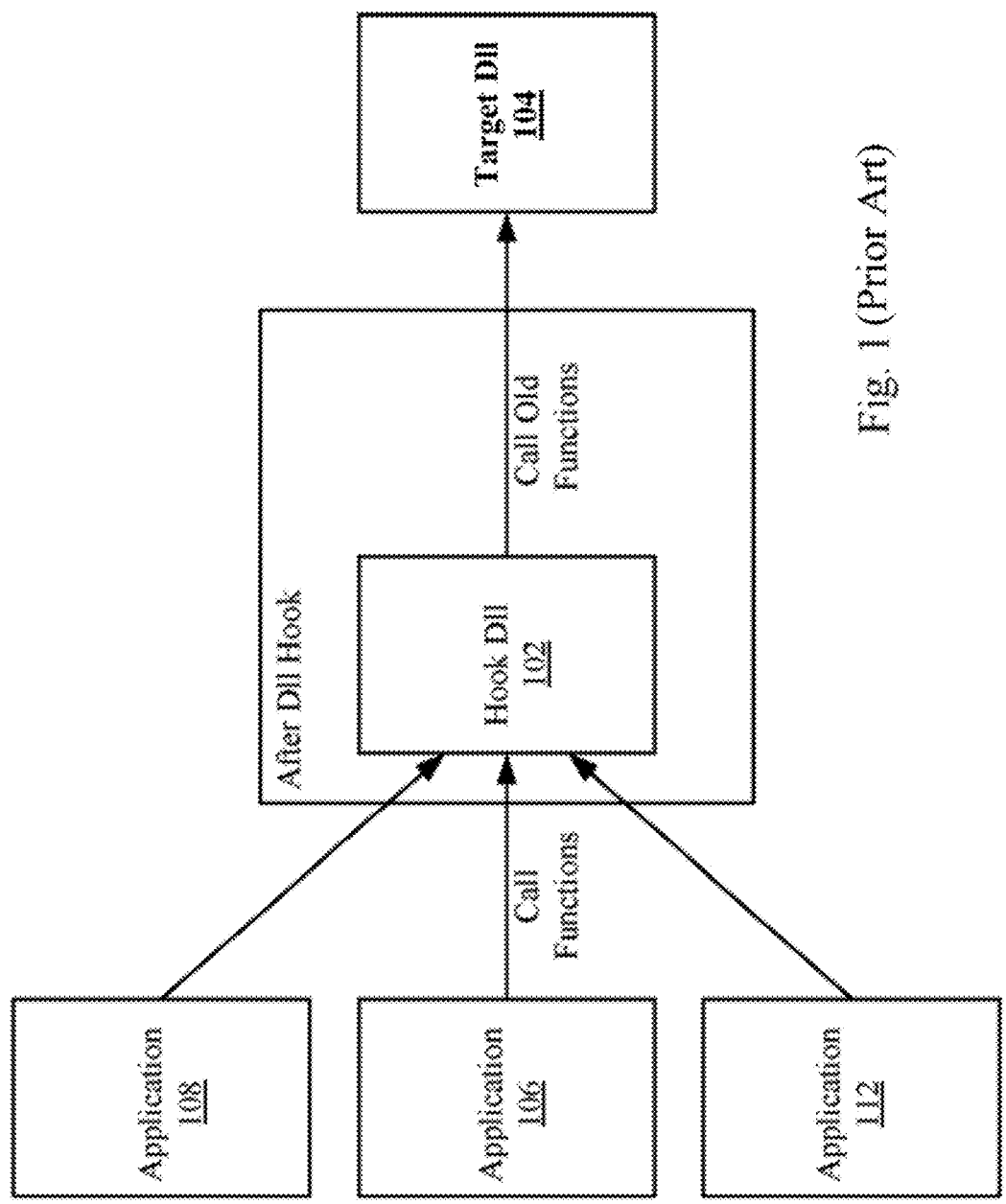
FIG. 1 shows an example environment wherein DLL replacement is practiced.
Figure 2:
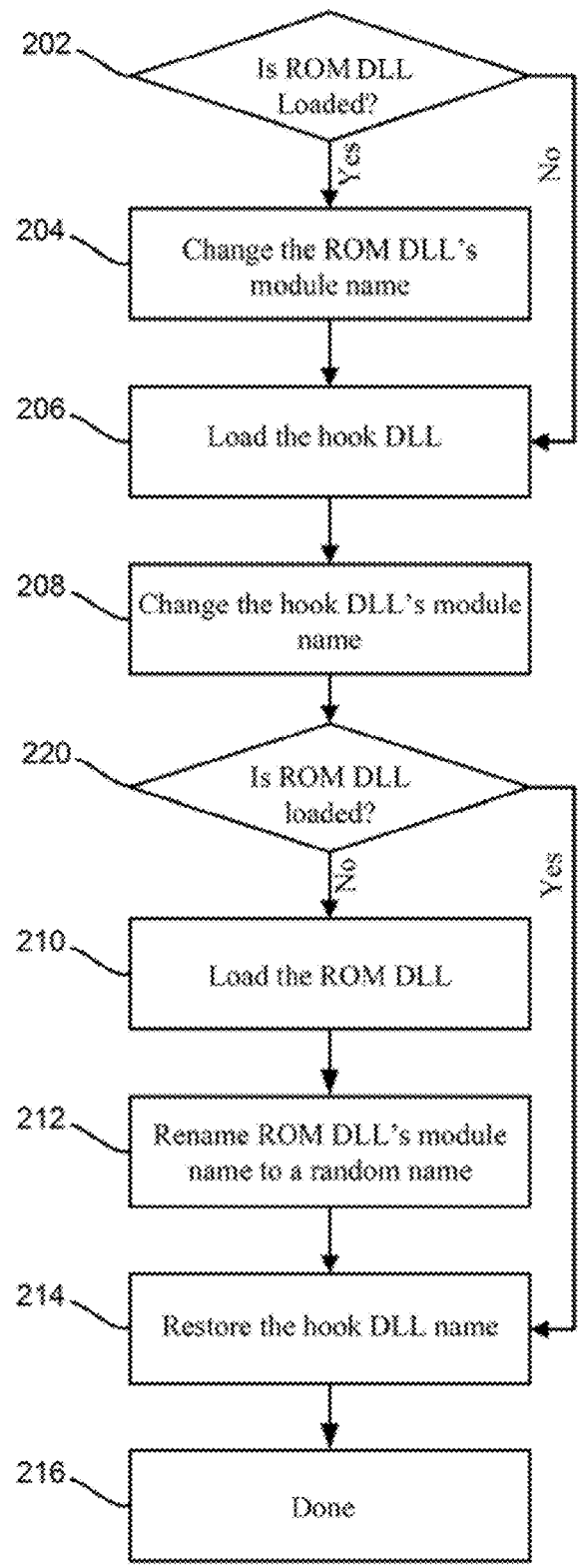
FIG. 2 shows, in accordance with an embodiment of the present invention, a flowchart implementing the DLL replacement technique for the WINDOWS CE operating system platform.

The features and advantages of the present invention may be better understood with reference to the figures and discussions that follow. FIG. 2 shows, in accordance with an embodiment of the present invention, a flowchart implementing the DLL replacement technique for the WINDOWS CE operating system platform. The steps of FIG. 2 are preferably performed by a trusted application, i.e., one that runs in the full kernel mode under the WINDOWS CE operating system platform or a platform having a similar requirements for DLL replacement.

In step 202, the method ascertains whether the target DLL has been loaded by ascertaining the list of loaded DLLs. If the target DLL has already been loaded first (the "yes" branch from step 202), the method proceeds to step 204 to change the name of the target DLL module to some random or pre-arranged name that is different from the existing name. In so doing, the name change of the target DLL allows the hook DLL, which has the same file name as the name of the target DLL module prior to the name change of step 204 to be loaded (step 206). On the other hand, if the target DLL is not loaded (the "no" branch from step 202), the method also proceeds to load the hook DLL in step 206.

In step 208, the name of the hook DLL is changed. This change in the hook DLL name makes it possible for the target DLL, if it has not been loaded already as ascertained by step 202, to be loaded. Accordingly, in step 210, the target DLL is loaded if it is ascertained in step 220 that the target DL has not been loaded. Note that the target DLL module has a file name that is the same as the file name of the hook DLL module prior to the name change in step 208.

In step 212, the name of the target DLL is changed to a random or pre-arranged name that is known only to the hook DLL. Step 212 is also the next step if it is ascertained in step 220 that the target DLL has already been loaded. Thus, after the name change of step 212, the target DLL is directly called only by the hook DLL since the name of the target DLL is now unknown to all other applications except for the hook DLL.

In step 214, the name of the hook DLL is restored to the intended name, i.e., the name that is known to applications so that the hook DLL may be called by applications running on the computer system. The method completes in step 216.

FIG. 3 shows, in accordance with an embodiment of the present invention, a code section for implementing DLL replacement by replacing the ROM-based target DLL with a RAM hook DLL in the WINDOWS CE operating system environment.

Figure 4:
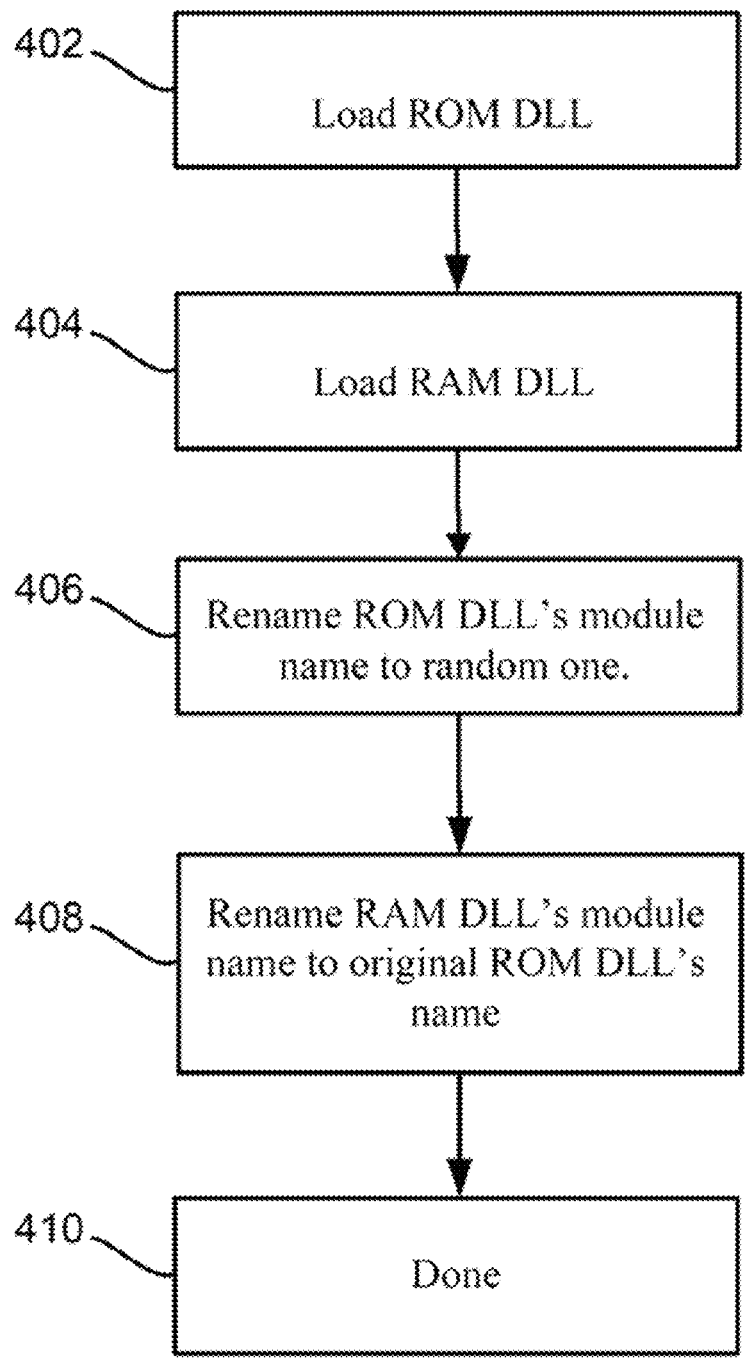
FIG. 4 shows, in accordance with an embodiment of the present invention, a method for replacing a ROM-based target DLL in the WINDOWS CE operating system environment.

FIG. 4 shows, in accordance with an embodiment of the present invention, a method for replacing a ROM-based target DLL in the WINDOWS CE operating system environment. In the example of FIG. 4, the replacement RAM-based hook DLL has a file name that is different from the file name of the target ROM-based DLL. In step 402, the target DLL is loaded. In step 404, the hook DLL is loaded. Since these two DLLs have different file names, the WINDOWS CE operating system permits both DLLs to be loaded. In step 406, the file name of the target DLL is changed to a random or pre-arranged name that is known only to the hook DLL. Thus, after the name change of step 406, the target DLL is directly called only by the hook DLL since the name of the target DLL is now unknown to all other applications.

In step 408, the file name of the hook DLL is changed to the file name that the target DLL has prior to the name change of step 406. This name change of step 408 ensures that the hook DLL can be called by applications executing in the computer system. The method completes in step 410.

As can be appreciated from the foregoing, the invention allows a target DLL to be "replaced" in the WINDOWS CE operating system environment by loading the hook DLL so that subsequent calls from applications are made to the hook DLL instead of to the original target DLL. The target DLL name is changed to a name that is known only by the hook DLL so that only the hook DLL can directly call the target DLL. Embodiments of the invention enable this DLL replacement technique even if the file name of the target DLL and the file name of the replacement hook DLL are the same prior to loading. Further, embodiments of the invention enable DLL replacement irrespective whether the target DLL or the hook DLL is loaded first during execution.

While this invention has been described in terms of several embodiments, there are alterations, permutations, and equivalents, which fall within the scope of this invention. For example, irrespective whether or not the target DLL is a RAM DLL, embodiments of the invention still can successfully perform DLL replacement. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A method for replacing a DLL (Dynamic Link Library) in an operating system environment, the method comprising:

loading a first one of a hook DLL and a target DLL, said target DLL representing a DLL to be replaced, said hook DLL representing a DLL for replacing said target DLL, wherein said target DLL represents a ROM-based (Read-Only Memory) DLL;

accessing a list of loaded DLLs for ascertaining whether said target DLL has been loaded before said hook DLL is loaded;

after said accessing, if said ascertaining indicates that said hook DLL is loaded before said target DLL is loaded, changing a file name of said hook DLL to a first temporary name, thereafter loading said target DLL, thereafter changing a file name of said target DLL to a private name that is subsequently callable by said hook DLL but not callable by other applications executing in said operating system environment, and thereafter restoring said file name of said hook DLL from said first temporary name to a name that is callable by said other applications, wherein said changing said file name of said target DLL is performed using a trusted program that executes in a full kernel mode in said operating system environment, and wherein said changing said file name of said target DLL comprises manipulating said file name of said target DLL in a list of loaded DLL modules; and after said accessing, if said ascertaining indicates that said target DLL is loaded before said hook DLL is loaded, changing said file name of said target DLL to said private name, and thereafter loading said hook DLL.

2. The method of claim 1 wherein said hook DLL is configured to be callable by an anti-virus application program.

3. A method for replacing a DLL (Dynamic Link Library) in a Windows CE (Window Embedded Compact) type embedded operating system environment, the method comprising:

loading one of a hook DLL and a target DLL, said target DLL representing a DLL to be replaced, said hook DLL representing a DLL for replacing said target DLL, wherein said target DLL represents a ROM-based (Read-Only Memory) DLL;

loading another of said hook DLL and said target DLL;

accessing a list of loaded DLLs for ascertaining whether said target DLL has been loaded before said hook DLL is loaded;

after said accessing and based on said ascertaining, determining that said target DLL has been loaded before said hook DLL is loaded;

after said determining, changing a file name of said target DLL to a private name that is subsequently callable by said hook DLL but not callable by other applications executing in said Windows CE type embedded operating system environment, wherein said changing said file name of said target DLL is performed using a trusted program that executes in a full kernel mode in said Windows CE operating system environment, and wherein said changing said file name of said target DLL comprises manipulating said file name of said target DLL in a list of loaded DLL modules; and changing a file name of said hook DLL to a name that said target DLL has prior to said changing said file name of said target DLL to said private name.

4. The method of claim 3 wherein said hook DLL is configured to be callable by an anti-virus application program.

5. An article of manufacture having thereon a programmable medium for storing computer readable code configured for replacing a DLL (Dynamic Link Library) in an operating system environment, the article of manufacture comprising:

computer readable code for loading a first one of a hook DLL and a target DLL, said target DLL representing a DLL to be replaced, said hook DLL representing a DLL for replacing said target DLL;

computer readable code for accessing a list of loaded DLLs for ascertaining whether said target DLL has been loaded before said hook DLL is loaded;

computer readable code for, after said accessing, changing, if said ascertaining indicates that said hook DLL is loaded before said target DLL is loaded, a file name of said hook DLL to a first temporary name, thereafter loading said target DLL, thereafter changing a file name of said target DLL to a private name that is subsequently callable by said hook DLL but not callable by other applications executing in said operating system environment, and thereafter restoring said file name of said hook DLL from said first temporary name to a name that is callable by said other applications;

computer readable code for, after said accessing, changing, if said ascertaining indicates that said target DLL is loaded before said hook DLL is loaded, said file name of said target DLL to said private name, and thereafter loading said hook DLL; and a programmed computing device for performing tasks associated with one or more of said computer readable code for said loading, said computer readable code for said accessing, said computer readable code for said changing said file name of said hook DLL, and said computer readable code for said changing said file name of said target DLL, wherein said changing said file name of said target DLL is performed using a trusted program that executes in a full kernel mode in said operating system environment, and wherein said changing said file name of target DLL comprises manipulating said file name of said target DLL in a list of loaded DLL modules.

6. The article of manufacture of claim 5 wherein said hook DLL is configured to be callable by an anti-virus application program.

7. The article of manufacture of claim 5 wherein said private name is a random name.

* * * * *